May 18, 1954 — A. A. KALINSKE — 2,678,916
APPARATUS FOR TREATING A LIQUID WITH A GAS
Filed Dec. 7, 1949 — 2 Sheets-Sheet 1
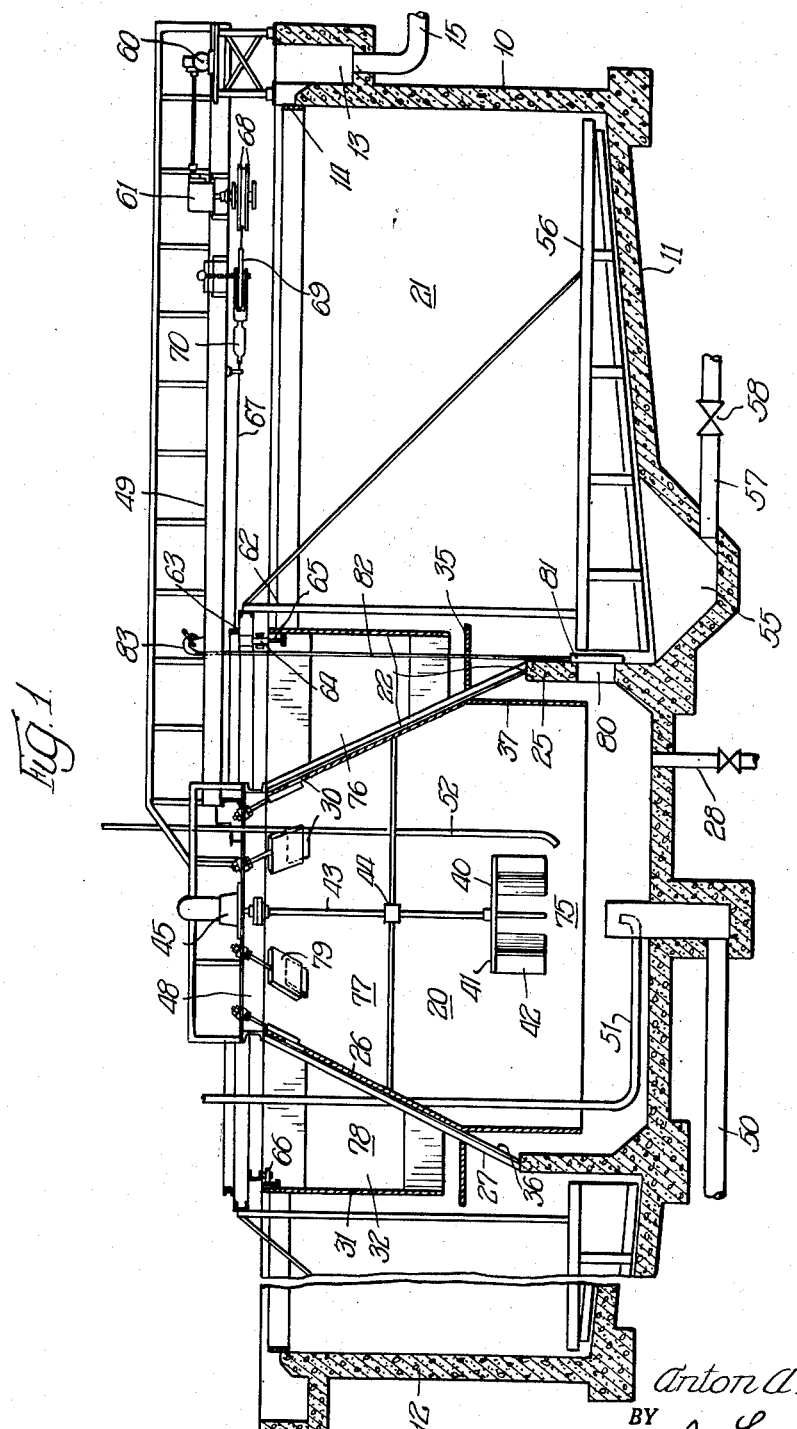
INVENTOR.
Anton A. Kalinske,
BY J. Gunz
agent, May 18, 1954
A. A. KALINSKE
2,678,916
APPARATUS FOR TREATING A LIQUID WITH A GAS
Filed Dec. 7, 1949
2 Sheets-Sheet 2
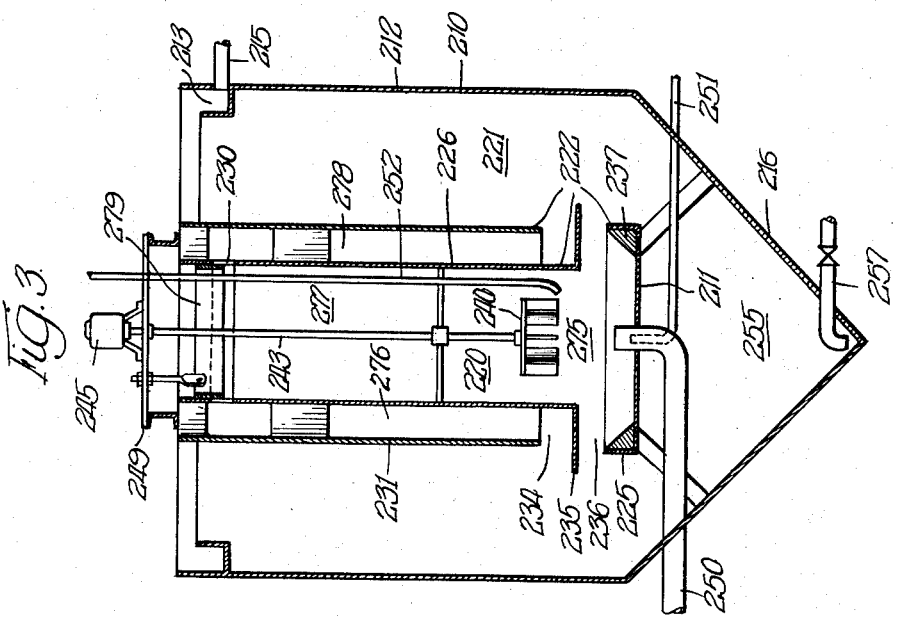
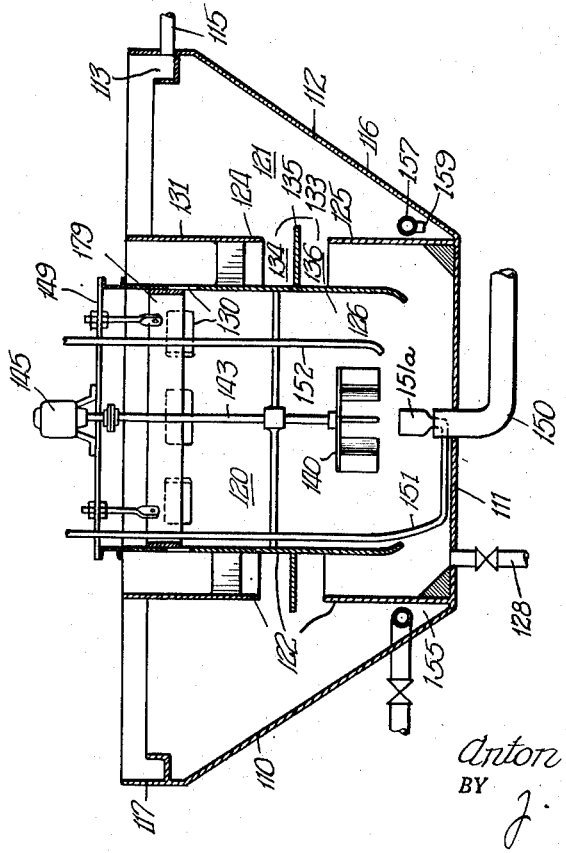
INVENTOR.
Anton A. Kalinske,
BY
Agent Patented May 18, 1954

2,678,916

UNITED STATES PATENT OFFICE 2,678,916

APPARATUS FOR TREATING A LIQUID WITH A GAS

Anton A. Kalinske, Elmhurst, Ill., assignor to Infilco Incorporated, Chicago, Ill., a corporation of Delaware Application December 7, 1949, Serial No. 131,615

10 Claims. (Cl. 210—16)

This invention relates to an apparatus for treating liquids to remove undesirable substances therefrom. More particularly, the invention relates to an apparatus for treating liquid by chemical or biological methods or by a combination of both, and for clarifying the treated liquid.

It is an object of this invention to provide a combined liquid treating and clarifying apparatus that is simple in construction and operation.

Another object is to provide an improved apparatus for the treatment of liquid by means of a gas such as oxygen, or carbon dioxide, and the separation of the treated liquid from the solids initially contained in the liquid and formed therein during the treatment.

Another object is to provide an apparatus for biologically purifying polluted liquid, such as sewage, and other liquid wastes and for clarifying the purified liquid.

Another object is to provide an apparatus for treatment of a polluted liquid by means of a gas, wherein the sludge is conditioned for sedimentation.

Certain liquids and liquid wastes can be treated by means of a gas, such as $CO_2$ or $O_2$. An example of a treatment using oxygen is the oxidation and coagulation of organic pollute contained in sewage and other polluted liquids. As an example of the use of carbon dioxide the treatment of tannery wastes and other waste liquids with a high content of hydrated lime may be mentioned. In such cases calcium carbonate is precipitated which assists in adsorbing and coagulating the other suspended matter in the waste.

Obviously in processes of this kind, high utilization of the gas is important. In my apparatus each volume of gas introduced per volume of liquid to be treated is brought into contact with, and is dispersed through a quantity of liquid under treatment far in excess of the volume of liquid for which such volume of gas is introduced.

The sludge produced in processes of this type is sometimes voluminous and has poor settling qualities. Thus it is a well known fact, that activated sludge settles only very slowly, necessitating long retention in the final clarifier for good clarification. Even after prolonged sedimentation activated sludge is light and has a high liquid content. It has been usual, therefore, to mix activated sludge from the final clarifier with raw sludge in the primary clarifier to facilitate its removal by settling and concentration. In my apparatus the solids formed in the treatment are conditioned for sedimentation by the return to the reaction zone of solids formed in and accumulated from previously treated liquid, which are in the process of thickening and sedimenting and have undergone a predetermined degree of thickening but have not been fully thickened and sedimented. Such partially thickened sludge from previously treated liquid is an excellent aid for coagulation, the reaction products of the chemical or biological treatment precipitating on the larger partially thickened solids of the sludge and thus immediately forming large readily settleable particles instead of the usual light, small particles. The sludge returned to the reaction chamber of my apparatus, the newly entering liquid to be treated and the gas used in the treatment are quickly dispersed throughout the entire reaction chamber contents.

When used for biological treatment of sewage and the like the biological sludge returned from the sedimentation chamber of my apparatus to the aeration and mixing chamber is in an active aerobic state as it is recirculated to the aeration chamber before it has come to full rest in the sedimentation chamber and undergone anaerobic conditions. The degree of thickening of the returned sludge can be regulated as desired by withdrawing the partially thickened sludge from a suitable elevation.

My invention will be more fully understood by reference to the drawings wherein

Figure 1 is a vertical cross-sectional view of a preferred embodiment of the invention;

Figure 2 is a vertical cross-sectional view of another embodiment of the invention; and Figure 3 is a vertical cross-sectional view of still another embodiment of the invention.

The apparatus of Figure 1 comprises a tank 10 which may be of any suitable form and material, but which is shown for purposes of illustration as a round concrete tank, having a substantially flat bottom 11 and a peripheral wall 12. A launder 13 surrounds the upper part of the wall 12. Liquid flows from the tank into the launder 13 over a weir 14 and is discharged from the launder through an effluent conduit 15.

The tank 10 is divided into a centrally located inner chamber 20 and an outer clarifying or sedimentation chamber 21 by partition means, generally indicated as 22, which extend from the bottom 11 to an elevation above the weir 14. The partition means 22 may take a variety of forms, but are shown for purposes of illustration as formed by a lower cylindrical wall 25 rising from the bottom 11, an upper frusto-conical partition 26 and an annular tube 31 surrounding the upper part of the partition 26. The partition 26 is supported from the wall 25 by struts 27 to which the partition is affixed, as by welding. A drain 29 leads from the bottom of the chamber 20.

The chamber enclosed by wall 25 and partition 26 is in open communication with the surrounding space through an outlet 30 at an upper level of the partition 26. The outlet 30 may be in the form of a continuous slot, such as the slot 230 of Figure 3, or a plurality of ports 30 may be spaced around the partition 26, as shown in Figures 1 and 2. The cylindrical tube 31 extends from an elevation above the weir 14 downwardly into the clarifying liquid in the sedimentation chamber 21. The tube 31 may derive support from the conical partition 26, as by brackets 32. A horizontal baffle 35, is likewise supported from the partition 26 and extends outwardly therefrom at an elevation spaced below the lower end of the tube 31, deflecting liquid discharged from the tube 31 outwardly into the sedimentation chamber 21.

The partition 26 may end at the level of the baffle 35, leaving a continuous inlet slot 36 between its lower end and the wall 25 which establishes communication between the sedimentation chamber and the lower part of the inner chamber 20. A vertical baffle 37 deflects the liquid entering through the inlet 36 downwardly toward the bottom of the chamber 20. The baffle 37 may be integral with or supported by partition 26.

Centrally arranged in the lower portion of the inner chamber 20 is a rotor-disperser 40. The disperser 40 is of the radial flow type and comprises a horizontal plate 41 and a plurality of narrow vertical blades 42 affixed to the underside of the plate 41. The blades 42 extend inwardly from, and are uniformly spaced around, the periphery of the plate 41, their width being less than the radius of the plate. The rotor is rigidly affixed to a shaft 43 which is journaled in a suitable bearing 44 and is driven by a motor-reducer 45. The motor-reducer 45 may be supported in any suitable manner as on a platform 48 carried by the conical partition 26. A bridge or walkway 49 is supported with its inner end from the platform 48 and with its outer end from the tank wall 12.

It will be obvious that extending the conical partition 26 to the top of the tank and providing the ports 30 is functionally the same as if the partition were extended only to the elevation of the outlet 30 and the liquid were allowed to overflow its upper edge. However, I prefer the construction shown, as the partition, due to its conical shape and the reinforcement by the struts 27 provides a very strong and convenient supporting structure for the platform 48 and the tube 31 and the parts supported by both.

Liquid to be treated arrives through an inlet conduit 50, and gas is introduced through a gas line 51. In the preferred form of the apparatus illustrated in Figure 1, the inlet conduit 50 discharges upwardly through the bottom of the inner chamber 20, and the gas line 51 discharges into the inlet conduit 50. The two conduits may discharge separately. The liquid may be discharged into any desired portion of the suction flow of the rotor, but the gas must always be discharged below the plate 41 to prevent escape of the gas to the liquid surface before it has been dispersed through the liquid in the inner chamber.

When using $CO_2$ as the gas in the treatment, the $CO_2$ instead of being introduced from an outside source can be obtained from an underwater burner placed in the inner chamber 20 and discharging below the rotor, such as the burner 151a diagrammatically shown in Figure 2.

In addition to adding a gas, it may sometimes be desirable to add a coagulant or coagulant aid to assist in the coalescing of the precipitated and incoming suspended matter. Such reagents can be introduced through any suitable reagent inlet line, such as pipe 52, discharging into the suction flow of the disperser 40.

The sedimentation chamber 21 is provided with a sludge sump 55 in its bottom and with a conventional rotatable sludge scraping assembly 56, which moves the sludge settled on the bottom of the chamber 21 to the sump 55 from where it is removed through a sludge outlet conduit 57 provided with a valve 58. The scrapers 56 may be rotated by any suitable means such as a cable drive from a motor 60 and reducer 61 supported on the bridge 49. As shown in Figure 1, the scraper trusses 62 are affixed to and supported by a rotatable ring 63 resting on wheels 64 which ride on a rail 65 supported by the tube 31. Guide wheels such as 66 are provided to prevent sideslipping of the wheels during rotation of the ring. The ring 63 is driven by means of an endless cable 67 which surrounds it and also runs over a pair of drive gears 68 which are mounted on the shaft of the reducer 61. A tension wheel 69, flexibly supported from the bridge 49 and positionable by a spring 70 keeps the cable 67 under proper tension.

The partition means 22 provides a gas dispersion and reaction space or chamber 75 in the lower part of the inner chamber 20 and a passageway 76 having an upflow section 77 leading from the upper part of the gas dispersion space upwardly to the liquid surface and a downflow section 78 discharging into the sedimentation chamber 21 at an intermediate elevation thereof. The gas bubbles rising through the upflow section 77 to the liquid surface produce a gas-lift action which causes a flow of liquid through the passageway 76 into the sedimentation chamber.

It is desirable to control the rate of flow through the passageway 76. I provide, therefore, for each port 30 a vertically adjustable gate 79. The gates 79 may be supported from the platform 48 by means of turnbuckles or the like, so that they can be raised or lowered to close any desired part of the ports 30.

The downflow section 78 of the passageway 76 must be of sufficient width to provide a relatively slow downflow in order to prevent disturbance of settling in the sedimentation chamber 21 by the liquid discharged from the passageway, or by undissolved air bubbles separating from the liquid and escaping to the surface in the sedimentation chamber. While the greater part of the gas bubbles will separate in the upflow section 77, some bubbles will be carried over into the downflow section 78. The flow should, therefore, be sufficiently slow to permit these undissolved gas bubbles to separate and escape to the liquid surface countercurrently to the downward flow of the liquid. The inverted conical shape of the downflow section 78 provides a large escape surface for the gas.

The inlet from the sedimentation chamber into the gas dispersion chamber can be located at any desired elevation above the thickened sludge in the sedimentation chamber and below the baffle 35 to provide a solids concentration of the return sludge suitable for the particular process carried out and the particular liquid treated in the apparatus.

Since the quantity and quality of the liquid to be treated may vary considerably either at regular intervals or spontaneously, it is desirable to provide means which permit selective variation of the quantity and quality of the solids returned from the sedimentation chamber. I provide, therefore, one or more auxiliary inlet ports 80, preferably through the wall 25, adjacent but above the level of the fully sedimented sludge in the chamber 21. These ports will usually be closed, as by gates 81, which can be raised or lowered from the bridge 49 by any suitable means, such as chains 82 or the like, and cranks 83. When the quality or quantity of the liquid to be treated requires more solids than can be returned through the inlet 36, or solids that have undergone a higher degree of thickening, one or more gates 81 may be opened partially or fully to admit through auxiliary port or ports 80 an additional amount of partially thickened sludge of somewhat higher concentration than the sludge returned through inlet 36. Similarly, in starting the operation of the apparatus, the building up of the desired solids concentration in the gas dispersion and reaction chamber can be enhanced by opening the auxiliary port or ports 80 for some time.

In operation, when treating, for example, a waste liquid with a high content of hydrated lime, the waste water and carbon dioxide are discharged below the rotor 40 and are quickly picked up by the rotor and dispersed through the circulating contents of the gas dispersion and reaction space 75. Due to this immediate thorough dispersion each volume of entering gas comes into contact with much larger volumes of liquid under treatment than are introduced per volume of gas. This leads to a very high gas utilization. Partially thickened sludge from an intermediate level of the sedimentation chamber 21 is continuously returned to the gas dispersion space 75 through inlet 36. The reaction between the hydrated lime in the entering liquid and the carbon dioxide occurs, therefore, in the presence of partially thickened calcium carbonate precipitated from previously treated liquid, the new particles immediately precipitating on the larger old particles. Thus the formation of pin point particles is entirely avoided and a dense heavy precipitate formed, which will settle readily in the quiescent sedimentation chamber.

The undissolved gas bubbles and inert gases that may be present separate from the circulation in the gas dispersion chamber 75 and produce a gas lift action which causes flow of liquid through the upflow section 77 to the outlet 30 and through the downflow section 78 into the sedimentation chamber. The velocity of this flow can be controlled by adjustment of the gates 79. Due to the gas lift action the liquid level in the partition 26 is somewhat higher than the liquid level established by the weir 14.

The quantity of partially thickened sludge returned to the gas dispersion chamber 75 should usually be at least equal to the throughput flow, but ordinarily a much greater quantity, such as a multiple of the throughput flow, will be returned. Obviously, therefore, the rotor must have a corresponding dispersing capacity in excess of the throughput, and sufficient undissolved gases must be present to maintain the circulation of such a quantity of liquid through the passageway 76 and the return thereof to the gas dispersion chamber through the inlet 36.

It is a well known fact that the consistency of the sludge in a sedimentation chamber increases downwardly. There is a zone of thickened, fully settled sludge at the bottom of the sedimentation chamber, a zone of partially sedimented and thickened solids above said zone of fully settled sludge, and a zone of clarified liquid in the upper portion of the sedimentation chamber. The consistency of the liquid discharged into the sedimentation chamber is higher than that of the clarifying liquid above the discharge level, but somewhat lower than that of the liquid returned through inlet 36 from the zone of partially thickened sludge in the sedimentation chamber to the gas dispersion chamber 75. An output portion of clarified liquid is continuously displaced from the zone of clarified liquid in the upper portion of the sedimentation chamber over the weir 14 into the launder 13 and withdrawn through effluent conduit 15. Fully thickened sludge deposited on the floor of the sedimentation chamber 21 is scraped into the sump 55 and is withdrawn through conduit 57 intermittently or continuously.

The apparatus of Figure 2 is quite similar to the embodiment of Figure 1, but is somewhat simpler. This type of apparatus is especially suitable for relatively small plants. In this embodiment of the invention the tank 110 has a flat bottom 111, provided with a drain 128, and a side wall 112 which has a lower sloping portion 116 and an upper cylindrical portion 117. Treated liquid overflows into a launder 113 from where it is withdrawn through an outlet conduit 115. The tank 110 is divided into an inner chamber 120 and an outer chamber 121 by partition means generally indicated as 122. The partition means 122 include an inner vertical annular partition 126 and a partition structure 124 surrounding it. The inner partition 126 extends from an elevation spaced above the bottom 111 to an elevation above the overflow into the launder 113 and may be supported from a bridge or beam 149 spanning the tank 110. The partition structure 124 rises from the periphery of the bottom 111 and extends to above the normal liquid level in the tank. The partition structure 124 is provided with an apertured portion 133, which may be formed in any suitable manner, for example as a continuous slot between a lower wall 125 rising from and surrounding the bottom 111, and an upper wall or tube 131, spaced vertically from the wall 125. The tube 131 may be supported from the inner partition 126 as shown. A horizontal baffle 135, also supported from the annular partition 126, extends therefrom into the slot 133 and separates it into an upper outlet portion or passageway 134 and a lower inlet portion or passageway 136.

The inner chamber 120 communicates with the space formed between the partition 126 and the tube 131 by means of an outlet, which may be a continuous slot, as shown in Figure 3, or a plurality of outlet ports 130. Obviously the partition 126 could extend only to the elevation of the ports 130 and the liquid overflow its top edge. A vertically adjustable sleeve 179 fits snugly into the upper part of the partition 126 and is supported by, and can be raised and lowered from, the bridge 149 by any suitable means such as turnbuckles.

A rotor-disperser 140, of the same construction as the rotor 40 described in connection with Figure 1, is axially aligned in the lower portion of the inner chamber. The rotor shaft 143 is driven by any suitable motor-reducer 145, which can be supported on the bridge 149.

Liquid to be treated arrives through conduit 150 and is discharged into the inner chamber 120 in the same manner as described in connection with Figure 1. In this embodiment a submerged burner 151a is diagrammatically shown to which the gas line 151 leads to provide the burner with a mixture of air and combustible gas. The burner 151a is of conventional design and need not be described, as such underwater burning equipment for carbonation is well known in the art. The $CO_2$ gas obtained from the burner 151a is discharged directly below the rotor 140. Obviously, also in this embodiment $CO_2$ or other suitable gas for the treatment can be introduced from an outside source through pipe 151, as described in connection with Figure 1, in which case the burner 151a is omitted. Any chemicals used in the particular process to be performed can be introduced, by a reagent line such as 152, into chamber 120.

The angular space between the lower ends of the walls 116 and 125 forms a sump 155 in which solids deposit and thicken. Thickened solids are removed from the sump 155 through a valved sludge outlet pipe 157 provided with spaced pick-up openings 159.

The operation of this embodiment is the same as described in connection with Figure 1, except that in this form of the invention the solids deposit in the sump 155 without being scraped, the inclination of wall 116 assisting the solids to slide down into the sump.

In the embodiment of Figure 3, as in that of Figure 2, no scraping mechanism is needed. The tank 210 of the apparatus of Figure 3 has a hopper bottom 216, which forms the sludge sump 255 of the apparatus wherein sludge deposits and thickens and from where it is withdrawn through a valved sludge outlet pipe 257. The tank 210 has a boundary wall 212 and a launder 213 into which treated liquid overflows. An effluent conduit 215 leads from the launder 213 to outside the tank.

As in the other embodiments, the tank 210 is divided into an inner chamber 220 and an outer sedimentation chamber 221 by partition means generally indicated as 222. The sedimentation chamber 221 is open through its bottom to the sump 255 while the inner chamber 220 is separated therefrom by a bottom 211. The bottom 211 may derive support from the hopper bottom 216 by any suitable means, such as the struts shown.

The partition means 222 is formed by a vertical wall 225 which surrounds the bottom 211 and rises upwardly therefrom, an inner vertical partition 226, which extends from an elevation spaced above the upper end of the wall 225 to an elevation above the overflow of the launder 213, and an outer partition or tube 231 extending from above the level of said overflow into the clarifying liquid to an elevation spaced above the lower end of the inner partition 226. A horizontal baffle 235 is mounted on the lower end of the inner partition 226 and extends outwardly therefrom, dividing the space between the lower end of the tube 231 and the upper end of the wall 225 into an outlet passageway 234 above the baffle, and an inlet passageway 236 below the baffle. A fill 237 directs the liquid entering chamber 220 through the inlet passageway 236 toward the center of the chamber and prevents the formation of deposits along the wall 225.

A slot 230 is provided in the partition 226. The effective size of the slot 230 can be regulated by an adjustable sleeve 279, supported from a bridge or beam 249 spanning the tank. This permits to control the flow velocity through the upflow and downflow sections 277 and 278 of passageway 276, which connects the lower portion of the chamber 220 with the sedimentation chamber 221. Instead of the continuous slot 230, a plurality of ports, such as shown in Figures 1 and 2, could be provided.

A rotor 240, of the same construction as the rotor 40 described in connection with Figure 1, is axially aligned in the lower portion of the space enclosed by partition 226. The shaft 243 of the rotor 240 may be driven by any suitable motor-reducer 245, which can be supported on the bridge 249.

An inlet conduit 250 for the liquid to be treated discharges upwardly through the bottom 211 below the rotor 240. A gas inlet pipe 251 is shown as discharging into the inlet conduit 250; it can discharge separately adjacent the conduit 250, but it must discharge below the plate of the rotor 240. Any reagents used in the treatment may be introduced through a reagent inlet 252.

The operation of this embodiment is the same as described in connection with Figure 1. As in that embodiment, the agitation and rotation set up by the rotor 240 should be limited to the lower portion of the inner chamber, which forms the gas dispersion and reaction space 275 of the apparatus, while flow through the passageway 276 is caused by gas lift. The deep, large sump 255 provided by the hopper bottom 216 is advantageous where complete dewatering of the thickened sludge is required and may obviate the need for a separate thickener.

It will be seen that in all embodiments of my apparatus high gas utilization is provided by the immediate dispersion of the entering gas and liquid through a relatively large body of liquid under treatment, each volume of gas introduced per volume of liquid to be treated being contacted with, and utilized in the treatment of, a much larger quantity of liquid than the volume for which it is introduced. Furthermore, the solids are conditioned for sedimentation by returning to the reaction zone selective quantities of partially sedimented and thickened solids from previously treated liquid. Due to this high gas utilization and the conditioning of the solids, the reactions and the subsequent clarification of the liquid proceed at a high rate. This permits the use of a relatively small apparatus with proportionate saving in cost.

I claim:

1. Apparatus for treating a liquid with a gas and clarifying the treated liquid comprising a sedimentation tank having a zone for settled sludge in its lower portion, a zone for clarified liquid in its upper portion, and a zone for partially settled sludge intermediate said upper and lower portions, an overflow for clarified liquid from said upper portion and an outlet for sedimented thickened sludge from said lower portion, a chamber centrally located in said tank, said chamber being enclosed by a bottom and a partition structure extending from said bottom and having overflow means below the liquid level established by said overflow for clarified liquid, a rotor-disperser of the radial flow type in a lower portion of said chamber, said rotor-disperser being dimensioned and positioned to set up a flow pattern confined to said lower portion of said chamber and including a radial outward flow and a radial inward flow of sufficient magnitude to maintain the contents of said lower portion in suspension and to disperse entering liquid and gas through said contents, means for discharging entering liquid to be treated and gas for the treatment into the radial inward flow of said rotor-disperser, a constantly open inlet passageway for partially thickened sludge communicating the lower portion of said chamber with said intermediate portion of said sedimentation tank, wall means forming with said partition structure, a constantly open outlet passageway communicating the upper portion of said chamber with said sedimentation tank and discharging at an elevation spaced above said inlet passageway and below said overflow means, and means for rotating said rotor-disperser.

2. The apparatus of claim 1 including also a normally closed inlet port for partially thickened sludge into the lower portion of said chamber, said port being at an elevation intermediate said constantly open inlet passageway and the level of said zone for settled sludge in said sedimentation tank, and means for selectively opening and closing said port.

3. In a liquid treating apparatus comprising a sedimentation tank having a bottom upon which sediment from the treated liquid settles in the form of a thickened sludge, a sludge outlet leading from said bottom and a clarified liquid outlet from an upper portion of said tank, a partition structure rising from said bottom, the lower portion of the space within said partition structure forming a gas dispersion and reaction chamber, a rotor of the radial flow type in said gas dispersion and reaction chamber, inlet means for liquid to be treated and gas for the treatment discharging into said gas dispersion and reaction chamber underneath said rotor, inlet means for returning partially thickened solids into said gas dispersion and reaction chamber from an elevation in said sedimentation tank spaced above said bottom, the upper portion of the space within said partition structure forming the upflow section of a gas lift passageway through which undissolved gas rises to the liquid surface, causing an upward flow of liquid, a tube surrounding the upper part of said partition structure and extending from an elevation above the level of said clarified liquid outlet downwardly into the clarifying liquid in said tank and forming with said partition structure the downflow section of said gas lift passageway, an overflow from said upflow section to said downflow section, and means for rotating said rotor.

4. A liquid treating apparatus comprising a tank, partition means in said tank forming therein an inner chamber and an outer sedimentation chamber, said sedimentation chamber having a zone for settled sludge in its lower portion, a zone for clarified liquid in its upper portion, and a zone for partially settled sludge intermediate said upper and lower portions, a clarified liquid overflow from said upper portion of said sedimentation chamber, means for withdrawing thickened sludge sedimented in said lower portion of said sedimentation chamber, outlet means from said inner chamber to said sedimentation chamber spaced below said clarified liquid overflow, inlet means from said intermediate portion of said sedimentation chamber into said inner chamber, an inner partition coaxial with said partition means and extending from an elevation spaced above the bottom of said tank and having an overflow means at an elevation below said clarified liquid overflow, said inner partition forming with the upper portion of said partition means a passageway leading from the upper portion of said inner chamber to said outlet means, and forming with the lower portion of said partition means a flow channel leading from said inlet means to the lower portion of said inner chamber, a rotor-disperser of the radial flow type axially aligned in the lower portion of said inner chamber, said rotor being constructed, dimensioned and positioned to set up in the lower portion of said inner chamber a closed cycle flow having an upper radial discharge flow spiraling outwardly to said inner partition means and a lower radial suction flow spiraling inwardly along the floor of said inner chamber to the axis of the rotor, means for discharging liquid to be treated and gas into the suction flow of said rotor, and means for rotating said rotor.

5. A liquid treating apparatus comprising a tank, clarified liquid outlet means from an upper portion of said tank and establishing a liquid level in said tank, partition means in said tank forming therein an inner chamber and an outer sedimentation chamber having a zone for thickened sludge in its lower portion, said chambers communicating with each other at two different levels spaced above said zone for thickened sludge in the sedimentation chamber and below the clarified liquid outlet means, said partition means including a vertical wall rising from the floor of said inner chamber, a vertical partition extending upwardly from an elevation spaced above said floor and having an overflow below the liquid level established by said outlet means, and an annular tube surrounding said partition and extending from an elevation above said clarified liquid outlet means to an elevation above the lower end of said partition, a horizontal baffle dividing the space between the upper end of said wall and the lower end of said tube into an upper outlet passageway and a lower inlet passageway, a rotor of the radial flow type axially aligned in a lower portion of said inner chamber, said rotor setting up a horizontal flow pattern confined to said lower portion and including a radial outward flow and a radial inward flow at a lower elevation, inlet means for liquid to be treated and for a gas discharging below said rotor, liquid guide means deflecting liquid entering the inner chamber through said passageway to the lower portion of said chamber, and means for withdrawing settled solids from the lower portion of said sedimentation chamber.

6. A liquid treating apparatus comprising a tank having a bottom portion where sediment from the treated liquid deposits in the form of a thickened sludge, means for removing sedimented thickened sludge from said tank, a clarified liquid overflow from an upper portion of said tank, partition means in said tank forming a centrally located inner chamber and a sedimentation chamber surrounding said inner chamber, the lower part of said inner chamber forming a gas dispersion and reaction space, an inlet for partially thickened solids from said sedimentation chamber into said gas dispersion and reaction space at an elevation spaced above said bottom portion of the sedimentation chamber, a rotor of the radical flow type in said gas dispersion and reaction space in the lower part of said inner chamber, inlet means for liquid to be treated and for gas discharging into said gas dispersion and reaction space below said rotor, said rotor setting up, upon operation thereof, a horizontal flow pattern having radial outward and radial inward components and confined to, and embracing the liquid contents of, said space, whereby entering liquid and gas are dispersed through said contents, a gas lift passageway leading from the upper portion of said gas dispersion and reaction space into said sedimentation chamber at an elevation intermediate said inlet for partially thickened sludge and said overflow, said gas lift passageway having an upflow section leading to adjacent the liquid surface and a downflow section leading from the liquid surface to said intermediate elevation, said upflow section being of sufficient height to permit separation therein of the major portion of undissolved gas from the liquid, and said downflow section being of sufficient width to permit separation of the balance of the undissolved gas counter-currently to the flow of the liquid, and means for rotating said rotor.

7. The apparatus of claim 6, including also adjustable means for controlling the rate of flow through said gas lift passageway.

8. Apparatus for treating a liquid with a gas and clarifying the treated liquid comprising a sedimentation tank having a hopper bottom and a vertical boundary wall, a clarified liquid outlet from an upper portion of said sedimentation tank, an outlet for thickened sludge sedimented in said hopper bottom, a chamber centrally located in said tank above said hopper bottom, said chamber being formed by a floor separating said chamber from the underlying portion of said tank, and by vertically extending partition means having a lower portion extending upwardly from said floor, and an upper portion spaced from said lower portion to form an inlet passageway for partially thickened sludge from a level of said sedimentation tank above said hopper bottom into the lower portion of said chamber, inlet means for liquid to be treated and for gas used in treating the liquid discharging into the lower portion of said chamber, a rotor mounted in the lower portion of said chamber above the level of discharge of said inlet means, a tube surrounding the upper portion of said partition means and extending from an elevation above said clarified liquid outlet downwardly into the clarifying liquid in said sedimentation tank to an elevation above said inlet passageway, overflow means from an upper portion of said chamber into the space enclosed by said partition means and said tube, and means for rotating said rotor, said rotor setting up a horizontally extending three-dimensional pattern of rotation and agitation in the lower portion of said chamber.

9. The apparatus of claim 8, including also adjustable means for controlling the effective area of said overflow means from the upper portion of said central chamber.

10. Apparatus for treating a liquid with a gas and separating the treated liquid from the solid reaction products comprising a tank having a bottom and an upwardly expanding boundary wall, vertically extending partition means separating in said tank an outer sedimentation chamber from an inner chamber, an overflow from an upper portion of said sedimentation chamber, means for withdrawing thickened sludge deposited in a lower portion of said sedimentation chamber, said partition means rising from said tank bottom and extending to an elevation above said overflow, a rotor disperser in the lower portion of said inner chamber, inlet means for liquid to be treated and for gas discharging below said rotor, a passageway leading from an upper portion of said inner chamber into said sedimentation chamber at an intermediate level thereof, a second passageway leading from said sedimentation chamber into the lower portion of said inner chamber, the inlet end of said second passageway being below the outlet end of said first passageway but above said lower portion of said sedimentation chamber, and means for rotating said rotor.

References Cited in the file of this patent

UNITED STATES PATENTS

| Number | Name | Date |
|---|---|---|
| 1,263,532 | Cummings | Apr. 23, 1918 |
| 2,245,588 | Hughes | June 17, 1941 |
| 2,268,726 | Tark | Jan. 6, 1942 |
| 2,296,437 | Green | Sept. 22, 1942 |
| 2,355,069 | Green | Aug. 8, 1944 |
| 2,391,697 | Green | Dec. 25, 1945 |
| 2,391,738 | Prager | Dec. 25, 1945 |
| 2,400,598 | Prager | May 21, 1946 |
| 2,422,258 | Prager | June 17, 1947 |
| 2,442,809 | Hallier et al. | June 8, 1948 |
| 2,444,671 | Prager | July 6, 1948 |
| 2,492,486 | Kivari et al. | Dec. 27, 1949 |
| 2,528,879 | Green | Nov. 7, 1950 |
| 2,528,907 | Paulette et al. | Nov. 7, 1950 |

FOREIGN PATENTS

| Number | Country | Date |
|---|---|---|
| 12,941 | Great Britain | July 1, 1893 |